(12) United States Patent  (10) Patent No.: US 8,998,132 B2
Burris  (45) Date of Patent: Apr. 7, 2015

(54) AERODYNAMIC WING LOAD DISTRIBUTION CONTROL

(75) Inventor: Curt B. Burris, Marietta, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 150 days.

(21) Appl. No.: 13/307,384

(22) Filed: Nov. 30, 2011

(65) Prior Publication Data

US 2013/0134258 A1  May 30, 2013

(51) Int. Cl.
  B64C 3/38   (2006.01)
  B64C 5/10   (2006.01)
  B64C 13/30  (2006.01)
  B64C 9/04   (2006.01)
  B64C 13/16  (2006.01)

(52) U.S. Cl.
  CPC . *B64C 9/04* (2013.01); *B64C 13/16* (2013.01); *B64C 13/30* (2013.01); *Y10T 29/49716* (2015.01); *Y10T 29/49826* (2015.01)

(58) Field of Classification Search
  None
  See application file for complete search history.

(56) References Cited

U.S. PATENT DOCUMENTS

| | | | |
|---|---|---|---|
| 1,853,233 A | | 4/1932 | Schwarz |
| 2,053,064 A | * | 9/1936 | Cederwall .................. 244/90 R |
| 2,612,329 A | * | 9/1952 | Crandall et al. ............. 244/217 |
| 2,670,909 A | * | 3/1954 | Replogle ..................... 244/216 |
| 3,077,575 A | | 2/1963 | Beck et al. |
| 3,860,200 A | * | 1/1975 | Petrushka ................... 244/207 |
| 4,110,605 A | | 8/1978 | Miller |
| 4,479,620 A | | 10/1984 | Rogers et al. |
| 4,725,020 A | | 2/1988 | Whitener |
| 4,796,192 A | | 1/1989 | Lewis |
| 4,937,754 A | | 6/1990 | Buisson et al. |
| 5,034,896 A | | 7/1991 | Orgun et al. |
| 5,186,416 A | * | 2/1993 | Fabre et al. .................. 244/191 |
| 5,407,153 A | | 4/1995 | Kirk et al. |
| 5,571,953 A | | 11/1996 | Wu |
| 5,823,471 A | * | 10/1998 | Dazet ........................ 244/99.3 |
| 5,836,550 A | * | 11/1998 | Paez ............................ 244/214 |
| 6,010,097 A | * | 1/2000 | Cox ............................. 244/216 |
| 6,754,566 B2 | | 6/2004 | Shimel |
| 6,913,228 B2 | | 7/2005 | Lee et al. |
| 2002/0047068 A1 | * | 4/2002 | Uchida et al. ............... 244/75 R |
| 2006/0043242 A1 | * | 3/2006 | Benson ........................ 244/175 |
| 2011/0031347 A1 | * | 2/2011 | Allen ......................... 244/99.3 |

(Continued)

OTHER PUBLICATIONS

Defense Science Board, Defense Science Board Task Force on Mobility, Memorandum for Under Secretary of Defense for Acquisition, Technology, and Logistics, Sep. 2005, 176 pages.

(Continued)

*Primary Examiner* — Tien Dinh
*Assistant Examiner* — Michael Wang
(74) *Attorney, Agent, or Firm* — Reising Ethington P.C.; John J. Snyder

(57) ABSTRACT

An aerodynamic wing load distribution control apparatus for increasing flight performance of an aircraft. The apparatus may include an aileron uprigger connectable to left and right ailerons of an aircraft and configured to uprig the left and the right wing ailerons of such aircraft. An operator interface communicates operator command inputs to the aileron uprigger. The aileron uprigger includes left and right actuators actuable in response to command inputs received from an operator through the operator interface and are connectable into respective left and right aileron control linkages of an aileron actuator assembly.

14 Claims, 4 Drawing Sheets

(56) References Cited

U.S. PATENT DOCUMENTS

2012/0091283 A1* 4/2012 Uchida et al. ................. 244/213
2013/0181089 A1* 7/2013 Recksiek et al. ............. 244/99.3

OTHER PUBLICATIONS globalsecurity.org, C-5 Design, www.globalsecurityorg/military/systems/aircraft/c-5-design.htm, Jul. 7, 2011, 4 pages.

G.E Bendixen, Digital Active Control System for Load Alleviation for the Lockheed L-1011, Aeronautical Journal, Nov. 1981, pp. 430-436, vol. 85, Elsevier Inc.

William J. Hargrove, The C-5A Active Lift Distribution Control System, Lockheed-Georgia Company, pp. 325-351.

Historical Review of C-5 Lift Distribution Control Systems, T.E. Disney and D.C. Eckholdt, pp. 295-323.

* cited by examiner

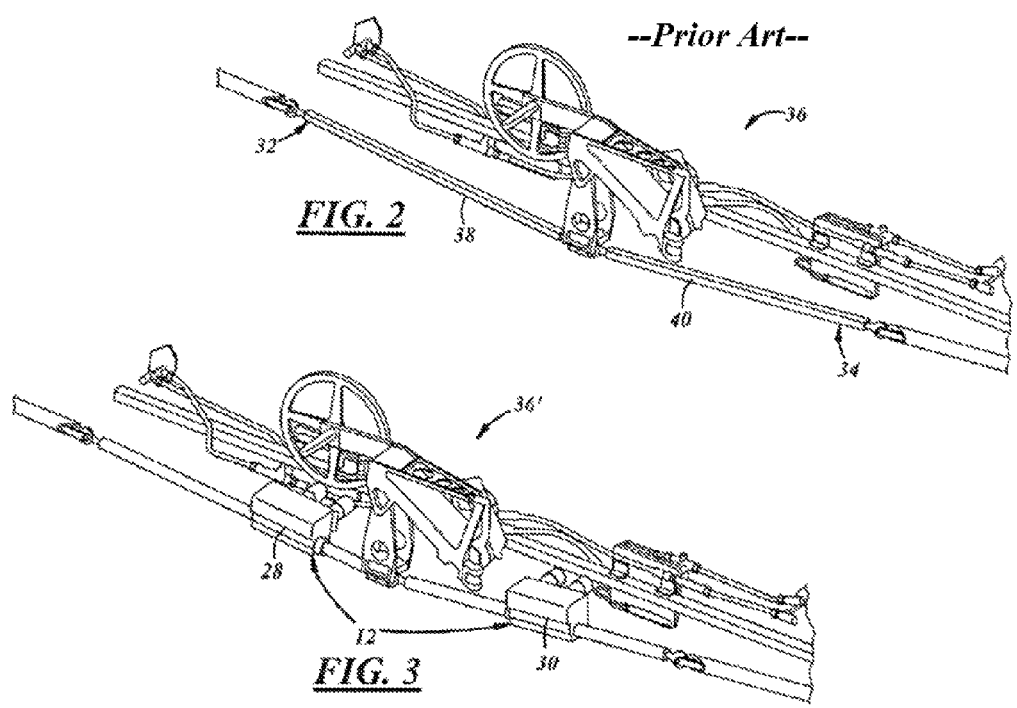

AERODYNAMIC WING LOAD DISTRIBUTION CONTROL

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

1. Field

This application relates generally to the use of aerodynamic wing load distribution control for increasing flight performance of an aircraft.

2. Description of Related Art Including Information Disclosed Under 37 CFR 1.97 and 1.98

It is known to improve structural fatigue life at the cost of a decrease in flight performance of a C-5A aircraft, e.g. an increase in drag, via aerodynamic wing load distribution control provided by uprigging the aircraft's ailerons. The aileron uprig, which decreases swept wing bending moments and torsional loads on the wings of the C-5A, involves increasing, by an equal amount, the degree of trailing edge-up deflection or "uprig" of both left and right wing ailerons. To provide the uprig an adjustment is made to respective neutral positions of the left and right wing ailerons by shortening respective left and right aileron feedback rods. The adjustment is made in such a way that an equal amount of trailing edge-up deflection is maintained by both the left and the right ailerons while still allowing operators to command differential deflections through roll control inputs to the ailerons via an operator interface. Also, studies have indicated that a "static" load reduction objective could be attained with a two position system having 5 degrees of uprig above 20,000 feet, 10 degrees of uprig below 20,000 feet, and the 5 degree setting in takeoff and landing configuration.

Another example of a known load distribution control system is an active load distribution Control System (ALDCS) apparatus that moves aileron and elevator control surfaces of a swept wing aircraft in response to command signals and input from sensors that detect gust and maneuver loads applied to the wings of the aircraft. A controller dynamically compensates for swept wing torsional loads by moving the ailerons and elevators in response to signals that are received from the sensors and that correspond to gust and maneuver loads perceived by the sensors.

SUMMARY

An aerodynamic wing load distribution control apparatus is provided for increasing flight performance of an aircraft. The apparatus may comprise an aileron uprigger connectable to left and right ailerons of an aircraft and configured to uprig the left and the right ailerons of such aircraft. The apparatus may also comprise an operator interface that may be configured to communicate operator command inputs to the aileron uprigger. The aileron uprigger may include left and right actuators configured to be actuable in response to command inputs received from an operator through the operator interface. The actuators may be drivingly connected into respective left and right aileron control linkages of an aileron actuator assembly such that actuation of the left and right actuators will adjust aileron uprig in response to inputs received from an operator via the operator interface. This enables an operator to actuate the ailerons to relieve bending loads on the wings, obviating any need to retain a load-relieving wing fuel load.

Also, a method is provided for increasing flight performance of an aircraft by connecting an aileron uprigger to left and right ailerons of an aircraft, actuating the aileron uprigger to move the ailerons to a positive aileron uprig position during a noncritical phase of flight, and actuating the aileron uprigger to move the ailerons to a reduced aileron uprig position during a critical phase of flight.

DRAWING DESCRIPTIONS

These and other features and advantages will become apparent to those skilled in the art in connection with the following detailed description and drawings of one or more embodiments of the invention, in which:

FIG. 2 is a perspective view of a C-130J aileron actuator assembly;

FIG. 3 is a perspective view of the C-130J aileron actuator assembly of FIG. 2 modified to include linear actuators in place of push-pull tubes;

Figure 4:
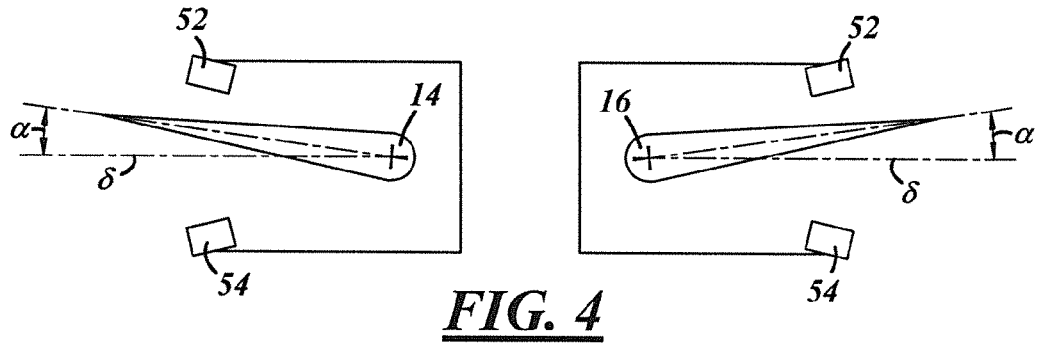
FIG. 4 is a schematic diagram showing end views of left and right ailerons in respective neutral positions with uprig engaged.
Figure 5:
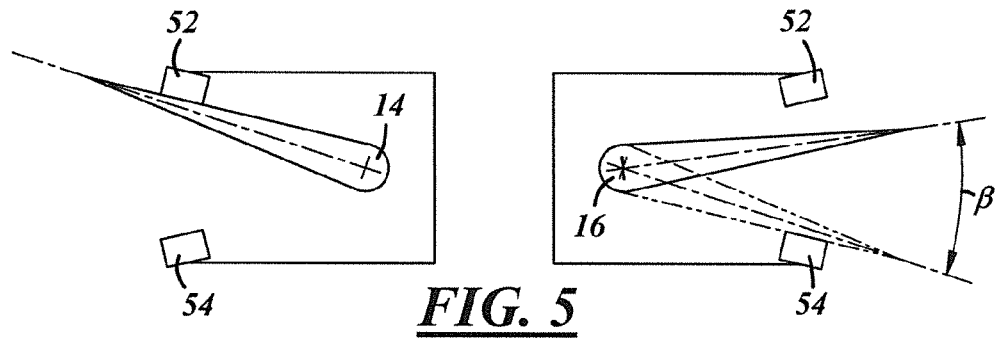
FIG. 5 is a schematic diagram showing the ailerons of FIG. 4 in a position resulting from a maximum left roll input with uprig engaged, the left aileron being deflected trailing-edge-upward against its upper stop and the right aileron deflected trailing-edge-down to a position spaced from its lower stop.
Figure 6:
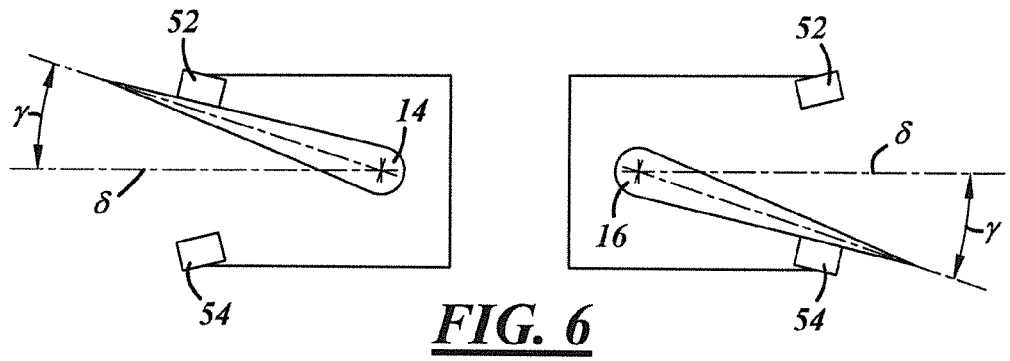
Figure 7:
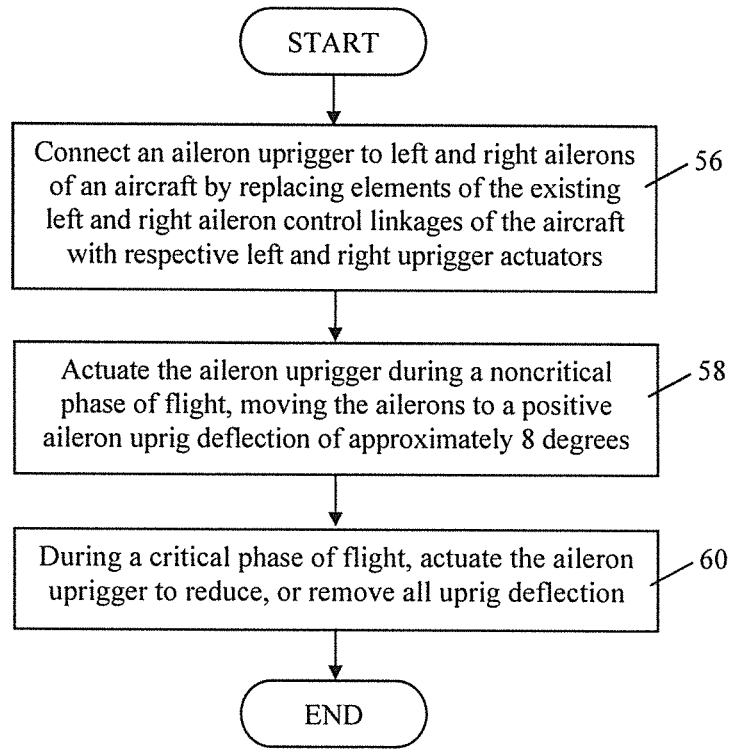

FIG. 6 is a schematic diagram showing the ailerons of FIGS. 4 and 5 in a position resulting from a full left roll input with uprig disengaged, the left aileron being deflected trailing-edge-upward against its upper stop and the right aileron being deflected trailing-edge-downward against its lower stop; and FIG. 7 is a flow chart showing a method for increasing flight performance of an aircraft using an aileron uprigger.

DETAILED DESCRIPTION

Figure 1:
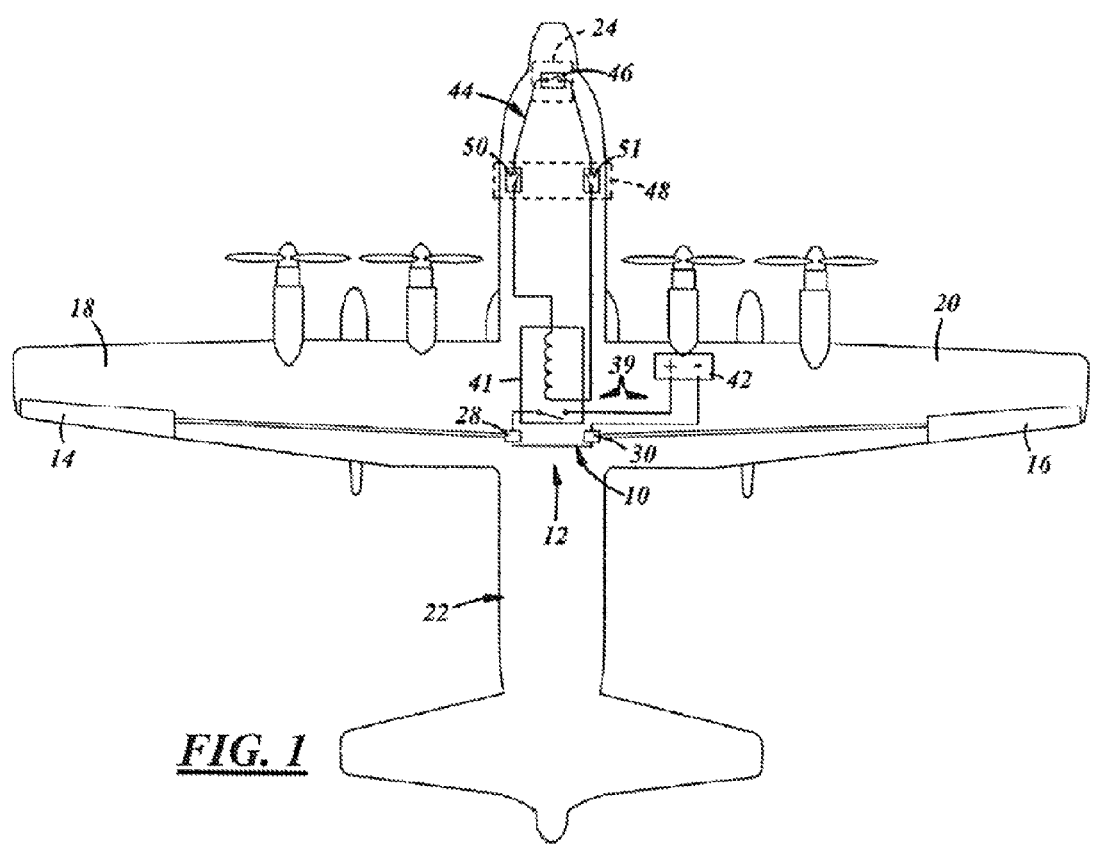
FIG. 1 is a schematic block diagram of an aileron uprigger superimposed on an outline of a C-130 aircraft.

An aerodynamic wing load distribution control apparatus for increasing flight performance of an aircraft is generally indicated at 10 in FIG. 1. The apparatus 10 may include an aileron uprigger 12 that may comprise actuators 28, 30 connectable to left and right ailerons 14, 16, i.e., the ailerons on left and right wings 18, 20 of an aircraft 22. The uprigger 12 may be configured to uprig, i.e., to increase, by an equal amount, the degree of trailing edge-up deflection or "uprig" α of both the left and the right wing ailerons 14, 16 of the aircraft 22 from respective neutral positions δ as shown in FIG. 4. The apparatus 10 may also include an operator interface 24 that communicates operator command inputs to the aileron uprigger 12. The interface 24 may be disposed in a position, such as a cockpit of the aircraft 22, that's accessible to an operator such as a flight crew member (and preferably a pilot). The interface 24 may be configured for scheduled operation (open-loop, operator control) of the apparatus.

The left and right uprigger actuators 28, 30 may be configured to be actuable in response to command inputs received from an operator through the operator interface 24. As is best shown in FIGS. 2 and 3, these actuators 28, 30 may be drivingly connected into respective left and right aileron control linkages 32, 34 in place of push-pull tubes 38, 40 of an existing aileron actuator assembly 36 (FIG. 2), to provide a modified aileron actuator assembly 36' (FIG. 3). Actuation of the left and right actuators 28, 30 will adjust aileron uprig α as shown in FIG. 4, in response to inputs received, for example, from an operator via the operator interface 24. Operator control of aileron uprig α allows an operator to disable the aileron uprigger 12 to maintain lift in critical phases of flight such as takeoff and landing, and to actuate the aileron uprigger 12 during less critical phases of flight (e.g., climb cruise and descent) where aileron uprig α will offset and effectively reduce spanwise wing bending loads.

The left and right uprigger actuators, shown at 28 and 30 in FIG. 3, may be linear actuators retrofittable in place of existing aileron push-pull rods such as those which, as shown at 38 and 40 in FIG. 1, are found in respective left and right aileron control linkages 32, 34 of an aileron actuator assembly 36 of an aircraft 22. The actuators 28, 30 may be configured such that extension and retraction of the left and right actuators 28, 30 will adjust aileron uprig in response to inputs received from an operator via the operator interface 24.

The left and right uprigger actuators 28, 30 may be configured and positionable in an aircraft aileron actuator assembly 36 to alternately provide zero uprig and a positive uprig in response to corresponding inputs received from the operator interface 24. An operator may thus be provided with the option of completely eliminating uprig α, and, consequently, any lift reduction induced by the uprig α, during critical phases of flight such as takeoff and landing An optimum degree of positive uprig α may be empirically determined for a given aircraft type. In a C-130J aircraft, for example, it has been found that eight degrees of aileron uprig α provides optimum performance gains.

As shown in FIG. 1, the apparatus 10 may include an uprig power circuit 39 including an uprig actuator relay 41 connectable in series with a high voltage power supply 42 (for example, an engine-driven electrical generator) and with the left and right linear actuators 28, 30. The operator interface 24 of the apparatus 10 may include an uprig control circuit 44 comprising an on-off switch 46 connected in series with the uprig actuator relay 41. The uprig control circuit 44 may be configured to allow an operator to alternately energize and de-energize the linear actuators 28, 30 by actuating the on-off switch 46 to alternately close and open the uprig control circuit 44, which alternately closes and opens the uprig power circuit 39.

FIG. 1 also shows that the aileron uprigger 12 may include an uprig release 48 actuable to reduce or eliminate uprig α in response to roll inputs that, as shown in FIG. 5, command a degree of differential aileron deflection β that would otherwise be limited by the uprig α. The uprig release 46 thus allows ailerons 14, 16 to move to full deflection γ from neutral δ at their respective trailing-edge-up and trailing-edge-down stops 52, 54 in response to full deflection roll commands as shown in FIG. 6. As a result of the operation of the uprig release feature, full roll input may result in a reduction in uprig α to zero degrees for whatever period of time the full roll input is maintained. As shown in FIG. 1, the uprig release 48 may include left and right control column microswitches 50, 51 that are connected into the actuator control circuit 44 in series with the on-off switch 46 so that both actuators 28, 30 will be de-energized and will resume their original lengths whenever any one of the switches 46, 50, 51 is opened. The control column microswitches 50, 51 need not be positioned on control columns but may, instead, be positioned anywhere where the microswitches 50, 51 will be actuated by maximum or near-maximum roll inputs.

In practice, and as shown in FIG. 7, an aircraft's flight performance may be improved by connecting an aileron uprigger 12 to left and right ailerons 14, 16 of an aircraft 22. As shown in action step 56 an aileron uprigger 12 may be retrofit into an aircraft 22 by replacing elements of the existing left and right aileron control linkages 32, 34 of the aircraft with respective left and right actuators 28, 30 of an aileron uprigger 12. For example, an aileron uprigger 12 may be retrofit into a C-130J aircraft by replacing existing push-pull tubes 38, 40 of left and right aileron control linkages 32, 34 of the C-130J aircraft with linear actuators 28, 30 as shown in FIGS. 1 and 2. The original control linkage elements 38, 40 (i.e., push-pull tubes) may be replaced with respective linear actuators 28, 30 that are of equal length when in respective extended states and that are of lesser length when in respective retracted states sufficient to provide a desired degree of aileron uprig.

During a noncritical phase of flight, e.g. during the cruise phase of a flight, the aileron uprigger 12 may be actuated as shown in action step 58 to move the ailerons 14, 16 to a positive aileron uprig deflection α of approximately 8 degrees to reduce spanwise wing bending loads. During a critical phase of flight, e.g., during takeoff, climb, final approach, landing, missed approach, and stall recovery, the aileron uprigger 12 may be actuated as shown in action step 60 to move the ailerons 14, 16 to a reduced aileron uprig position, or to a zero uprig position, to maintain lift characteristics.

In aircraft, such as the C-130J, for which certain cargo loads require that reserves of wing relieving fuel be maintained in the wings of such aircraft to reduce consequent high spanwise wing bending loads, an aileron uprigger as described above may be employed to apply relieving loads to the aircraft's wings, eliminating the need to carry the additional weight of wing relieving fuel, and allowing for improved flight performance during critical phases of flight. In aircraft having cambered fuselages, i.e., fuselages having upswept afterbodies, the above-described aileron uprigger may additionally decrease afterbody drag by causing the aircraft to fly at a slightly higher angle of attack, which decreases the angle between the afterbody and freestream airflow and thus the amount of afterbody flow separation.

This description, rather than describing limitations of an invention, only illustrates an embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An aerodynamic wing load distribution control apparatus for increasing flight performance of an aircraft, the apparatus comprising:
   an aileron uprigger connectable to left and right ailerons of an aircraft and configured to uprig the left and the right wing ailerons of such aircraft; and
   an operator interface configured to communicate operator command inputs to the aileron uprigger, the aileron uprigger including left and right actuators configured to extend and retract in response to command inputs received from an operator through the operator interface and to be drivingly connected into respective left and right aileron control linkages of an aileron actuator assembly such that extension and refraction of the left and right actuators will adjust aileron uprig in response to inputs received from an operator via the operator interface.

2. An aerodynamic wing load distribution control apparatus as defined in claim 1 in which the left and right actuators are configured to be retrofit in place of existing aileron push-pull rods of respective left and right aileron control linkages of an aileron actuator assembly of an aircraft such that extension and retraction of the left and right actuators will adjust aileron uprig in response to inputs received from an operator via the operator interface.

3. An aerodynamic wing load distribution control apparatus as defined in claim 2 in which the left and right actuators are configured to be retrofit in place of existing aileron push-pull rods of respective left and right aileron control linkages of an aileron actuator assembly of an aircraft that would otherwise require maintenance of a minimum quantity of wing relieving fuel in the aircraft wings throughout a flight to offset spanwise wing bending loads.

4. An aerodynamic wing load distribution control apparatus as defined in claim 2 in which the left and right actuators are configured and positionable in an aircraft aileron actuator assembly to alternately provide zero uprig and a positive uprig in response to corresponding inputs received from the operator interface.

5. An aerodynamic wing load distribution control apparatus as defined in claim 4 in which the left and right actuators are configured and positionable in a C-130 aircraft aileron actuator assembly to alternately provide zero uprig and 8 degrees of uprig in response to corresponding inputs received from the operator interface.

6. An aerodynamic wing load distribution control apparatus as defined in claim 4 in which:
   the apparatus includes an uprig power circuit including an uprig actuator relay connectable in series with a power supply and with the left and right actuators; and
   the operator interface of the apparatus includes an uprig control circuit comprising an on-off switch connected in series with the uprig actuator relay, the uprig control circuit being configured to allow an operator to alternately energize and de-energize the actuators by actuating the on-off switch to alternately close and open the uprig control circuit, which alternately closes and opens the uprig power circuit.

7. An aerodynamic wing load distribution control apparatus for increasing flight performance of an aircraft, the apparatus comprising:
   an aileron uprigger connectable to left and right ailerons of an aircraft and configured to uprig the left and the right wing ailerons of such aircraft;
   an operator interface configured to communicate operator command inputs to the aileron uprigger; and
   an uprig release connected to the aileron uprigger and configured to reduce uprig in response to differential aileron inputs that command a degree of differential aileron deflection that would otherwise be limited by the uprig.

8. An aerodynamic wing load distribution control apparatus as defined in claim 7 in which the aileron uprigger includes left and right actuators configured to be actuable in response to command inputs received from an operator through the operator interface and to be drivingly connected into respective left and right aileron control linkages of an aileron actuator assembly such that actuation of the left and right actuators will adjust aileron uprig in response to inputs received from an operator via the operator interface.

9. An aerodynamic wing load distribution control apparatus as defined in claim 8 in which left and right actuators are configured to be retrofit in place of existing aileron push-pull rods of respective left and right aileron control linkages of an aileron actuator assembly of an aircraft such that extension and retraction of the left and right actuators will adjust aileron uprig in response to inputs received from an operator via the operator interface.

10. An aerodynamic wing load distribution control apparatus as defined in claim 9 in which the left and right actuators are configured to be retrofit in place of existing aileron push-pull rods of respective left and right aileron control linkages of an aileron actuator assembly of an aircraft that would otherwise require maintenance of a minimum quantity of wing relieving fuel in the aircraft wings throughout a flight to offset spanwise wing bending loads.

11. An aerodynamic wing load distribution control apparatus as defined in claim 10 in which the left and right actuators are configured and positionable in an aircraft aileron actuator assembly to alternately provide zero uprig and a positive uprig in response to corresponding inputs received from the operator interface.

12. An aerodynamic wing load distribution control apparatus as defined in claim 11 in which the left and right actuators are configured and positionable in an aircraft aileron actuator assembly to alternately provide approximately zero uprig and approximately 8 degrees of uprig in response to corresponding inputs received from the operator interface.

13. An aerodynamic wing load distribution control apparatus as defined in claim 8 in which the uprig release is configured to reduce uprig to zero degrees in response to a full-scale roll input.

14. An aerodynamic wing load distribution control apparatus as defined in claim 13 in which:
   the apparatus includes an uprig power circuit including an uprig actuator relay connectable in series with a power supply and with the left and right actuators;
   the operator interface of the apparatus includes an uprig control circuit comprising an on-off switch connected in series with the uprig actuator relay;
   the uprig control circuit is configured to allow an operator to alternately energize and de-energize the actuators by actuating the on-off switch to alternately close and open the uprig control circuit, which alternately closes and opens the uprig power circuit; and
   the uprig release includes microswitches wired in series with the on-off switch in the actuator power supply circuit so that when any one of the switches is opened, both actuators are de-energized and move back to their original lengths.

* * * * *